(12) United States Patent
Bennett et al.

(10) Patent No.: US 7,199,796 B2
(45) Date of Patent: Apr. 3, 2007

(54) METHOD OF SELECTING PORTION OF A GRAPH, AND NETWORK ANALYZING APPARATUS USING SAME

(75) Inventors: Timothy Mark Bennett, Colorado Springs, CO (US); Scott Alan Blomquist, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 128 days.

(21) Appl. No.: 10/911,617

(22) Filed: Aug. 5, 2004

(65) Prior Publication Data

US 2006/0028470 A1    Feb. 9, 2006

(51) Int. Cl.
  *G06T 11/00*  (2006.01)
(52) U.S. Cl. .................................. 345/440.1; 715/736
(58) Field of Classification Search ................ 715/736; 345/642, 440, 440.1
  See application file for complete search history.

(56) References Cited

U.S. PATENT DOCUMENTS 6,590,587 B1 *  7/2003  Wichelman et al. ........ 715/736

OTHER PUBLICATIONS

Adobe Photoshop Album 2.0; At A Glance; 2 pp. www.adobe.com/products/photoshopalbum/pdfs/photoshopalbum_aag.pdf (Downloaded Aug. 5, 2004).

* cited by examiner

*Primary Examiner*—Almis Jankus

(57) ABSTRACT

Inflowing data is summarized in real time. The summarized data is displayed as a graph in real time. A portion of the graph is selected using dual sliders. And data that was summarized in real time and represented by the selected graph portion is operated on. Operating on the data that was summarized in real time and represented by the selected graph portion involves displaying components of the data that was summarized in real time and represented by the selected graph portion and/or exporting the data that was summarized in real time and represented by the selected graph portion. Displaying components of the data that was summarized in real time and represented by the selected graph portion involves displaying components of the data that was summarized in real time in one or more new graphs and/or displaying components of the data that was summarized in real time in tabular form.

26 Claims, 6 Drawing Sheets

METHOD OF SELECTING PORTION OF A GRAPH, AND NETWORK ANALYZING APPARATUS USING SAME

FIELD OF THE INVENTION

The present invention relates to a graphical user interface, and more particularly, to a graphical user interface for a network analyzing apparatus.

DESCRIPTION OF THE RELATED ART

As graphical user interface elements, sliders are well known. For example, in conventional word processors, sliders are used to represent margin boundaries on a page. A user can slide such sliders to change the page margins of a document, or a pre-selected section thereof, but such movement only changes the page margins, and does not operate on the displayed text itself, or provide greater detail about the text so that a user can perform more detailed analysis of the text.

SUMMARY OF THE INVENTION

Accordingly, it is an aspect of the present invention to provide a method and apparatus to aid analysis of real-time network data.

The foregoing and/or other aspects of the present invention are achieved by providing a method, including: (a) summarizing inflowing data in real time; (b) displaying the summarized data as a graph in real time; (c) selecting a portion of the graph using dual sliders; and (d) operating on data that was summarized in real time and represented by the selected graph portion.

The foregoing and/or other aspects of the present invention are also achieved by providing a method, including: (a) in a selectable graphical user interface, displaying summarized inflowing data in real time as a graph graphical element; and (b) integrating a dual slider graphical element with the graph graphical element. This enables a user to select a portion of the graph graphical element using the dual slider and operate on data that was summarized in real time and represented by the selected portion of the graph graphical element.

The foregoing and/or other aspects of the present invention are also achieved by providing an apparatus, including: (a) a graphical user interface providing summarized inflowing network traffic data in real time, in which a selectable graphical display displays the summarized data as a graph with dual sliders. This enables a user to select a portion of the graph using the dual sliders, and operate on data that was summarized in real time and represented by the selected graph portion.

Additional aspects and/or advantages of the invention will be set forth in part in the description which follows, and in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Figure 1:
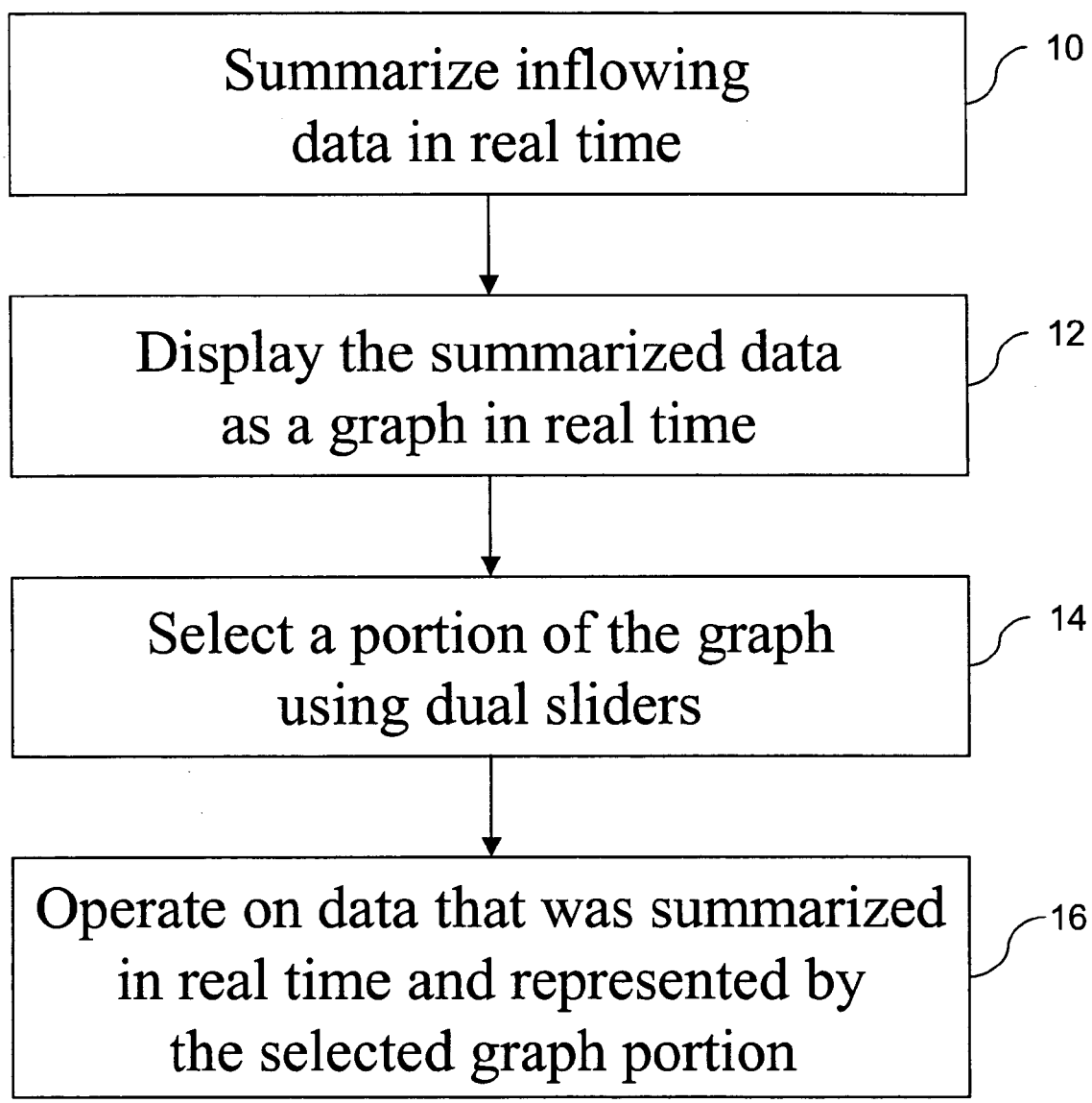
FIG. 1 illustrates a method according to an embodiment of the present invention.

Reference will now be made in detail to embodiments of the present invention, examples of which are illustrated in the accompanying drawings, wherein like reference numerals refer to the like elements throughout. The embodiments described below explain the present invention by referring to the figures.

As used in this application, dual sliders are a graphical element (made up of 2 small range finder graphical elements) integrated with another graphical element, for example, a graph that summarizes complex data, in a selectable graphical user interface. The dual sliders are used to define and select a portion of the graph, to operate on the underlying un-summarized data that was summarized in real time and represented by the selected graph portion.

In network management, a great deal of information is collected. Being able to monitor the network information and analyze discrete portions thereof is an important part of maintaining operational capabilities of a network. One example of a network requiring such management is a telephony network. More specifically, one example of a network requiring such management is a Voice over IP (VoIP) network, in which calls are routed using the Internet as the transmission medium, by sending voice data in packets using Internet Protocol (IP).

FIG. 1 illustrates a method according to an embodiment of the present invention. Referring to FIG. 1, in operation 10, inflowing data is summarized in real time. In operation 12 the summarized data is displayed as a graph in real time. In operation 14, a portion of the graph is selected using dual sliders. And in operation 16, data that was summarized in real time and represented by the selected graph portion, is operated on. For brevity, hereinafter, data that was summarized in real time, in other words, the full set of underlying data that was summarized in real time as it came in to a data collection point, and which was displayed as a graph in real time, will be referred to as un-summarized data.

According to one embodiment, operating on the un-summarized data involves displaying components of the un-summarized data and/or exporting the un-summarized data. Additionally, according to one embodiment, displaying the components of the un-summarized data involves displaying the components of the un-summarized data in one or more graphs, and/or displaying the components of the un-summarized data in tabular form.

Figure 2:
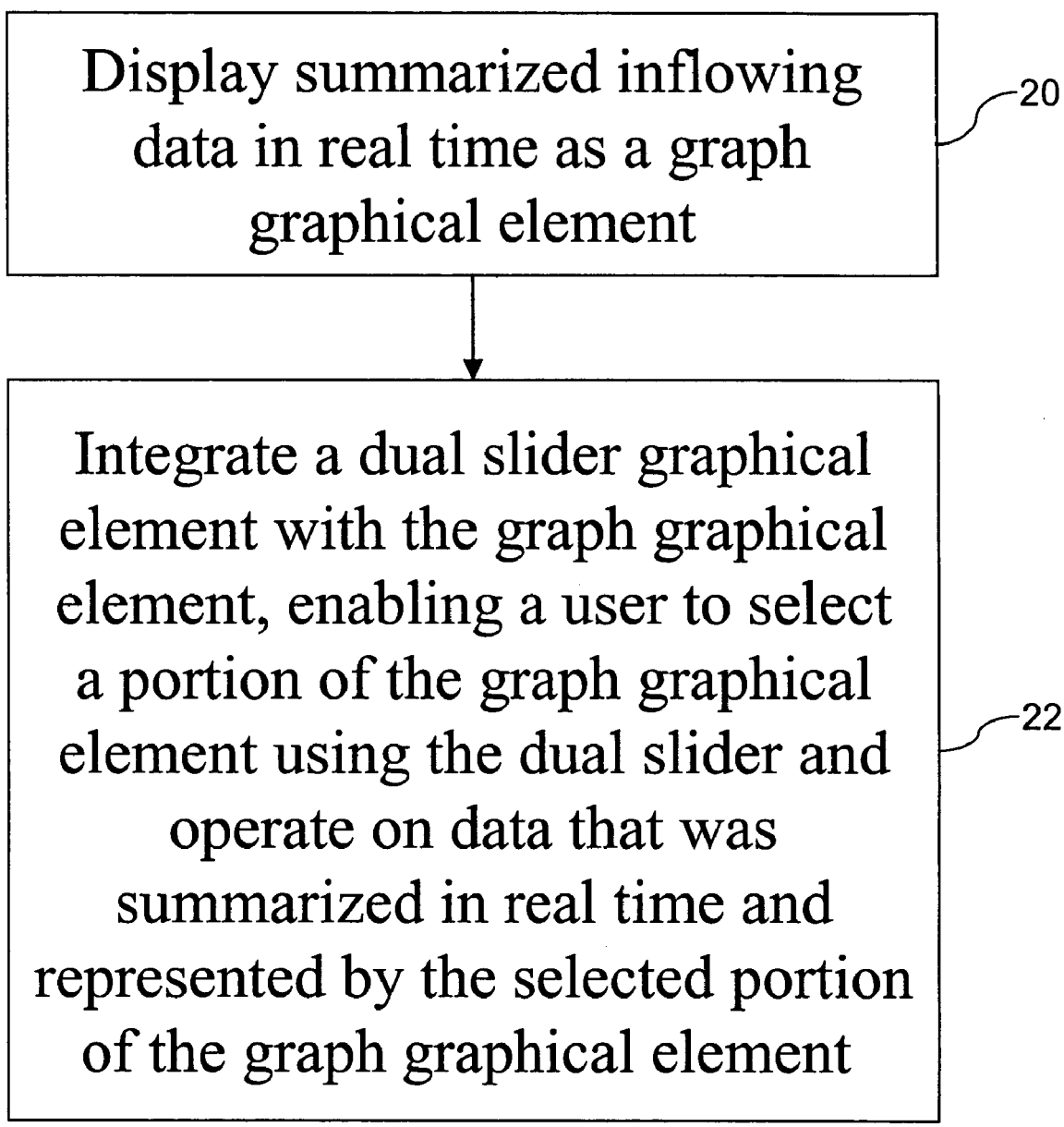
FIG. 2 illustrates another method according to an embodiment of the present invention.

FIG. 2 illustrates another method according to an embodiment of the present invention. Referring to FIG. 2, in operation 20, summarized inflowing data is displayed as a graph graphical element in real time. And in operation 22, a dual slider graphical element is integrated with the graph graphical element, enabling a user to select a portion of the graph graphical element using the dual slider, and operate on un-summarized data represented by the selected portion of the graph graphical element.

Figure 3:
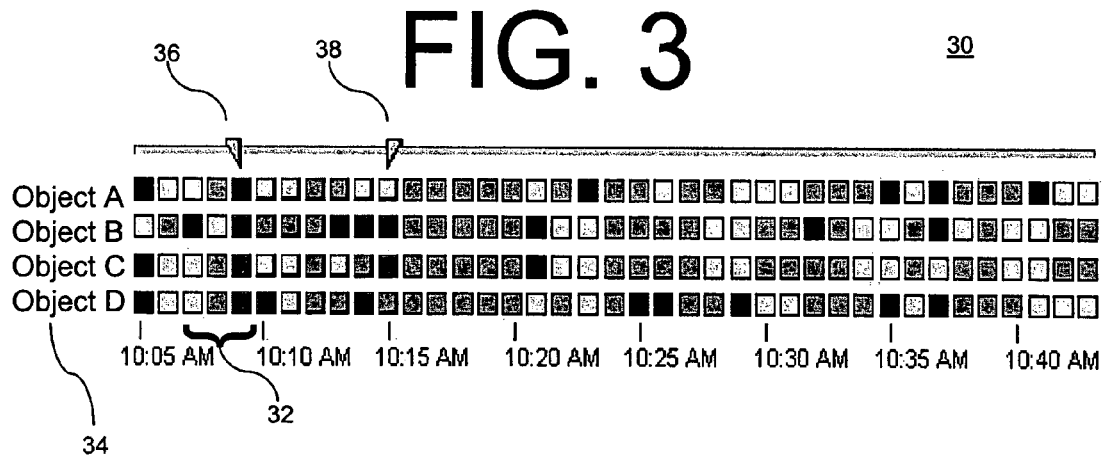
FIGS. 3–5 illustrate embodiments of the present invention applied to various graphs.
Figure 4:
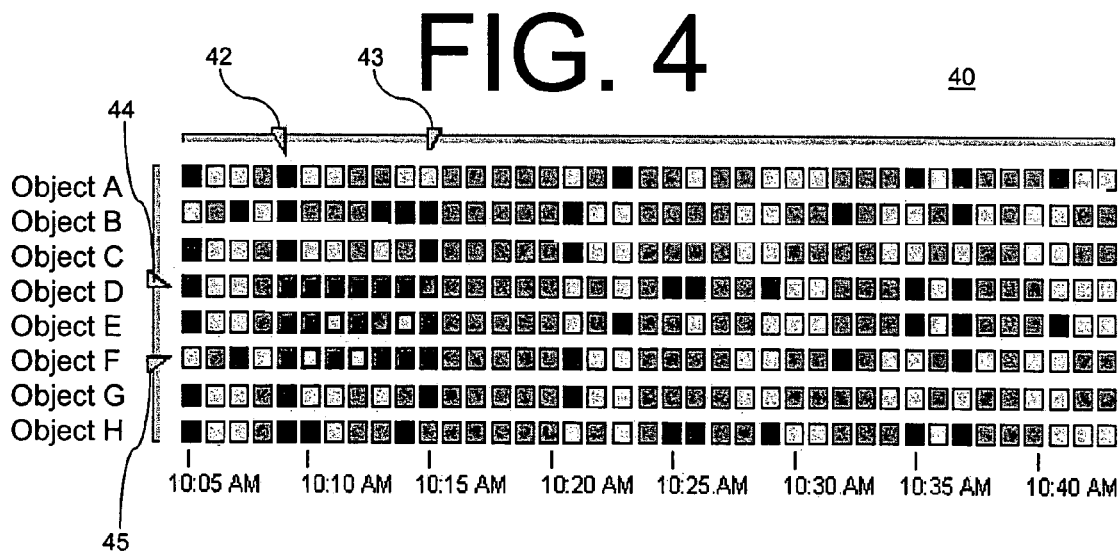
Figure 5:
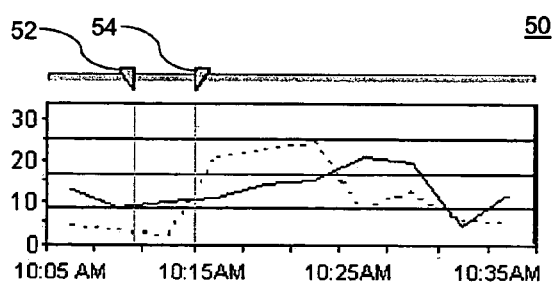

FIGS. 3–5 illustrate embodiments of the present invention applied to various graphs. FIG. 3 illustrates a threshold indicator graph 30, in which various performance threshold levels are indicated by gradations in color. For example, in FIG. 3, threshold levels are indicated as different shades of gray. According to one embodiment, the threshold levels indicate levels of status at a given time for a given object. For example, the status 32 of object D 34 changes from light gray to medium gray to dark gray between 10:05 a.m. and 10:10 a.m. As is shown in FIG. 3, first and second sliders 36 and 38, which form the dual sliders, are depicted as selecting a time interval from 10:09 a.m. to 10:15 a.m.

FIG. 4 illustrates a threshold indicated graph 40, in which first and second sliders 42 and 43 form dual sliders selecting a time interval, and third and fourth sliders 44 and 45 form dual sliders selecting objects D–F.

As is shown in FIGS. 3 and 4, the respective selected portions of threshold indicator graphs 30 and 40 are highlighted. According to one embodiment, the highlighting of the selected portions involves displaying the selected portions of the graphs 30 and 40 as being three-dimensional, and displaying the unselected portions of the graphs 30 and 40 as being two-dimensional. While FIGS. 3 and 4 depict highlighting the selected graph portions as displaying the selected graph portions as being three-dimensional, the present invention is not limited to displaying selected graph portions as being three-dimensional. Many other techniques may be employed to highlight selected graph portions, for example, changing a background appearance, and changing a color or shape of an object in a selected graph portion.

FIG. 5 illustrates a line graph 50, in which first and second sliders 52 and 54 form dual sliders selecting a time interval. While FIGS. 3–5 illustrate threshold indicator graphs 30 and 40, and line graph 50, the present invention is not limited to threshold indicator graphs and line graphs. Many other kinds of graphs may be used, for example, bar graphs, scatter graphs, and polar-coordinate graphs. Further, while FIGS. 3–5 illustrate one and two-dimensional dual sliders, the present invention is not limited to one and two-dimensional dual sliders. For example, three-dimensional dual sliders may be used, and polar-coordinate dual sliders may be used, in which one set of dual sliders may be used to select a radian interval, and another set of dual sliders may be used to select a radius interval in two or three dimensions.

Figure 6:
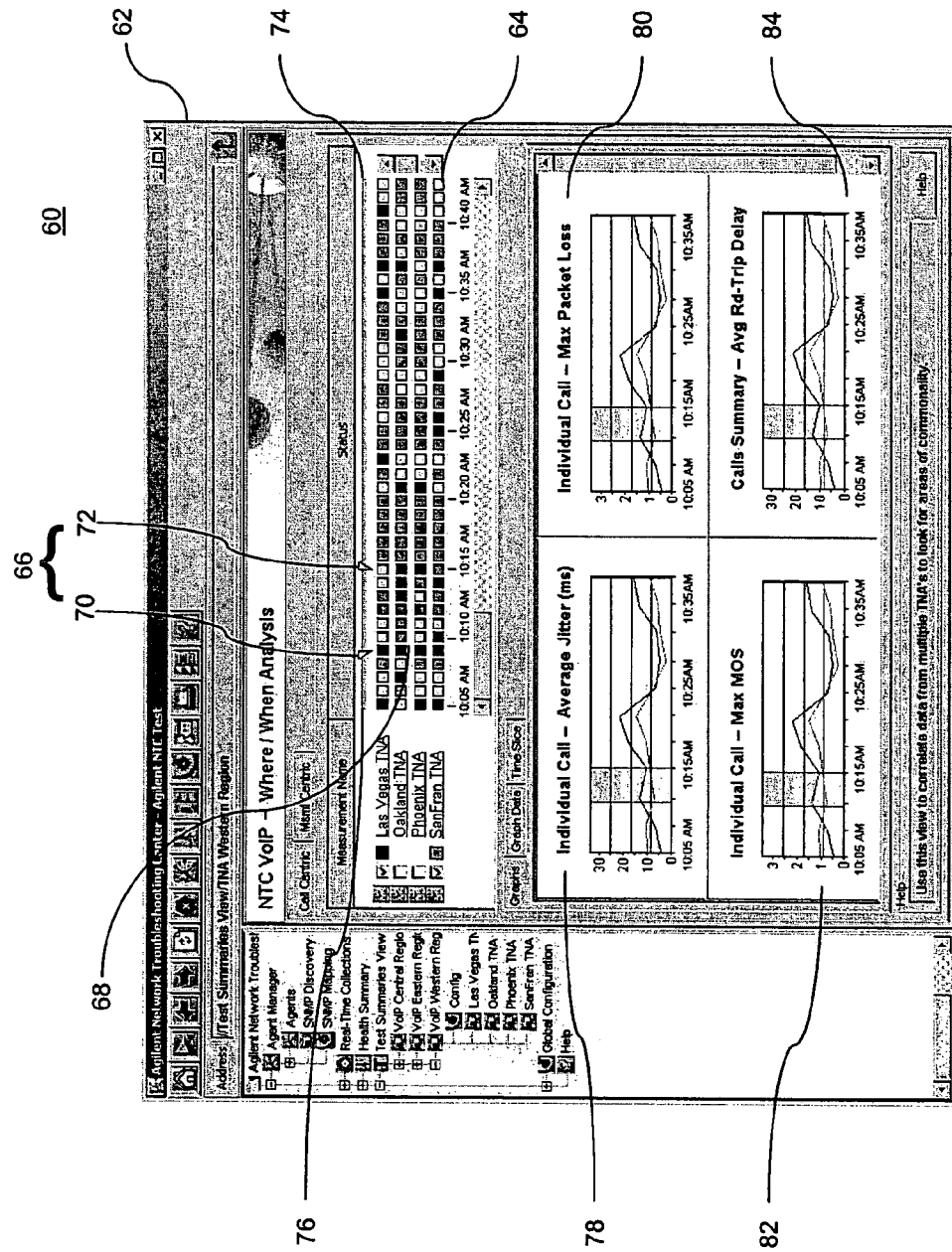
FIGS. 6–8 illustrate a network analyzing apparatus according to an embodiment of the present invention.

FIG. 6 illustrates a network analyzing apparatus according to an embodiment of the present invention. Referring to FIG. 6, a graphical user interface 60 provides summarized inflowing network traffic data in real time. According to the embodiment depicted in FIG. 6, the network is a voice-over-IP (VoIP) network. A selectable graphical display 62 displays the summarized data as a graph 64 with dual sliders 66. The dual sliders 66 enable a user to select a portion 68 of the graph 64, and operate on data that was summarized in real time (un-summarized data) and represented by the selected graph portion 68.

According to one embodiment the selectable graphical display 62 highlights the selected graph portion 68. According to one embodiment, the selectable graphical display 62 highlights the selected graph portion 68 by displaying the selected graph portion 68 as being three-dimensional and displaying non-selected graph portions as being two-dimensional.

According to one embodiment, when the user moves one of the dual sliders, for example, slider 70, in a first direction, for example to the right in FIG. 6, and contacts the remaining dual slider 72, both sliders 70 and 72 move in the first direction (to the right) until either the user stops moving the slider 70, or the slider 72 reaches a graphical barrier 74. Conversely, if the user moved slider 72 to the left in FIG. 6 and contacted slider 70, both sliders 70 and 72 would move to the left until either the user stopped moving the slider 72, or the slider 70 reached a graphical barrier 76.

According to one embodiment, operating on the un-summarized data represented by the selected graph portion 68 involves the selectable graphical display 62 displaying components of the un-summarized data represented by the selected graph portion 68 and/or exporting the un-summarized data. According to one embodiment, displaying components of the un-summarized data represented by the selected graph portion 68 involves the selectable graphical display 62 displaying components of the un-summarized data in one or more new graphs 78, 80, 82, and 84, and/or the selectable graphical display 62 displaying components of the un-summarized data in tabular form (see FIGS. 7 and 8).

According to one embodiment, such as the embodiment depicted in FIG. 6, summarized data is displayed as a threshold indicator graph 64, and components of the un-summarized data are displayed as component graphs 78–84. According to one embodiment, the thresholds of the threshold indicator graph 64 are displayed on the component graphs 78–84. For example, in each of the component graphs 78–84 there is a multihued column depicting not only the selected time interval, but also the respective thresholds (represented in each of the component graphs 78–84 by gradations of the color gray).

Figure 7:
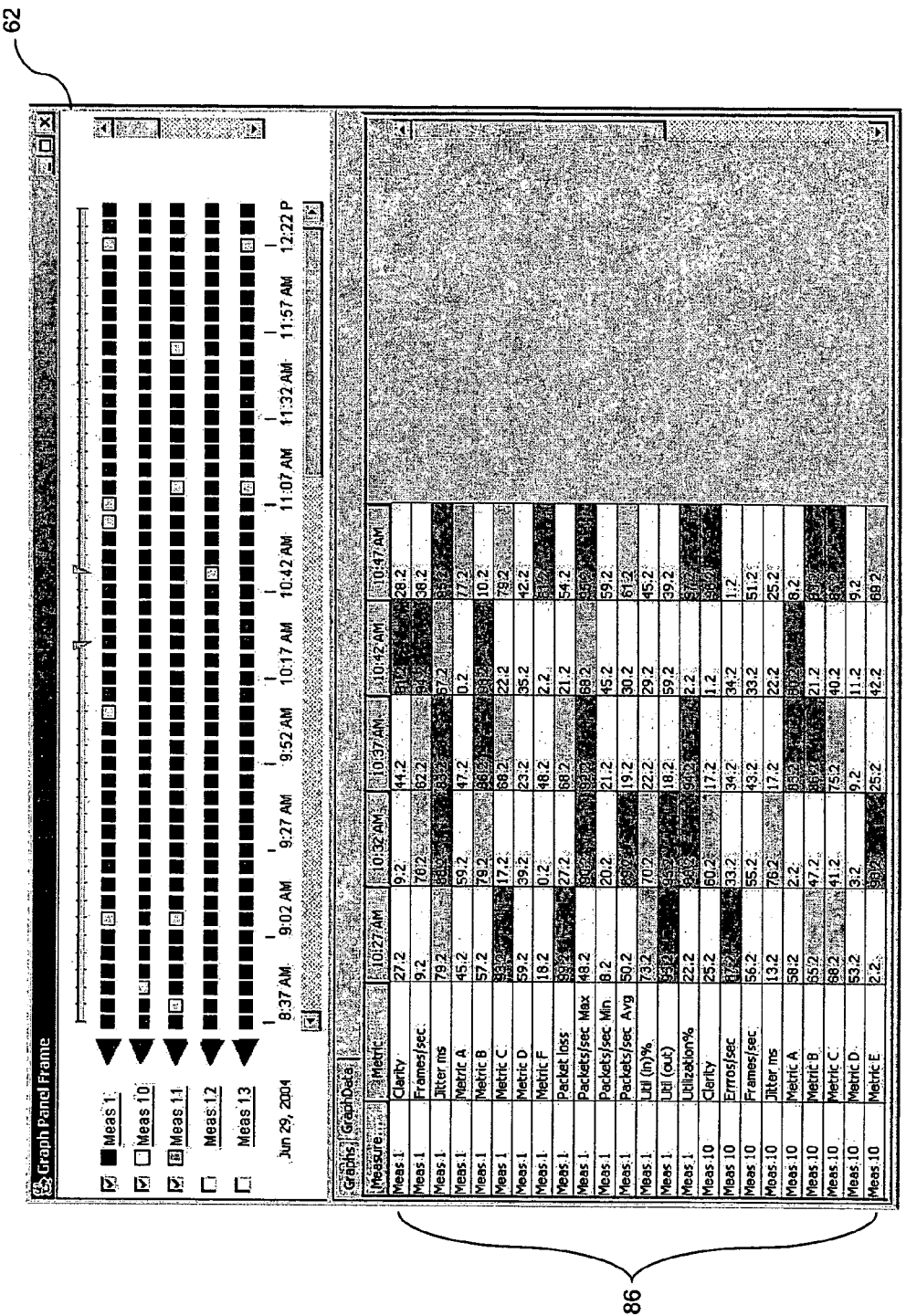
Figure 8:
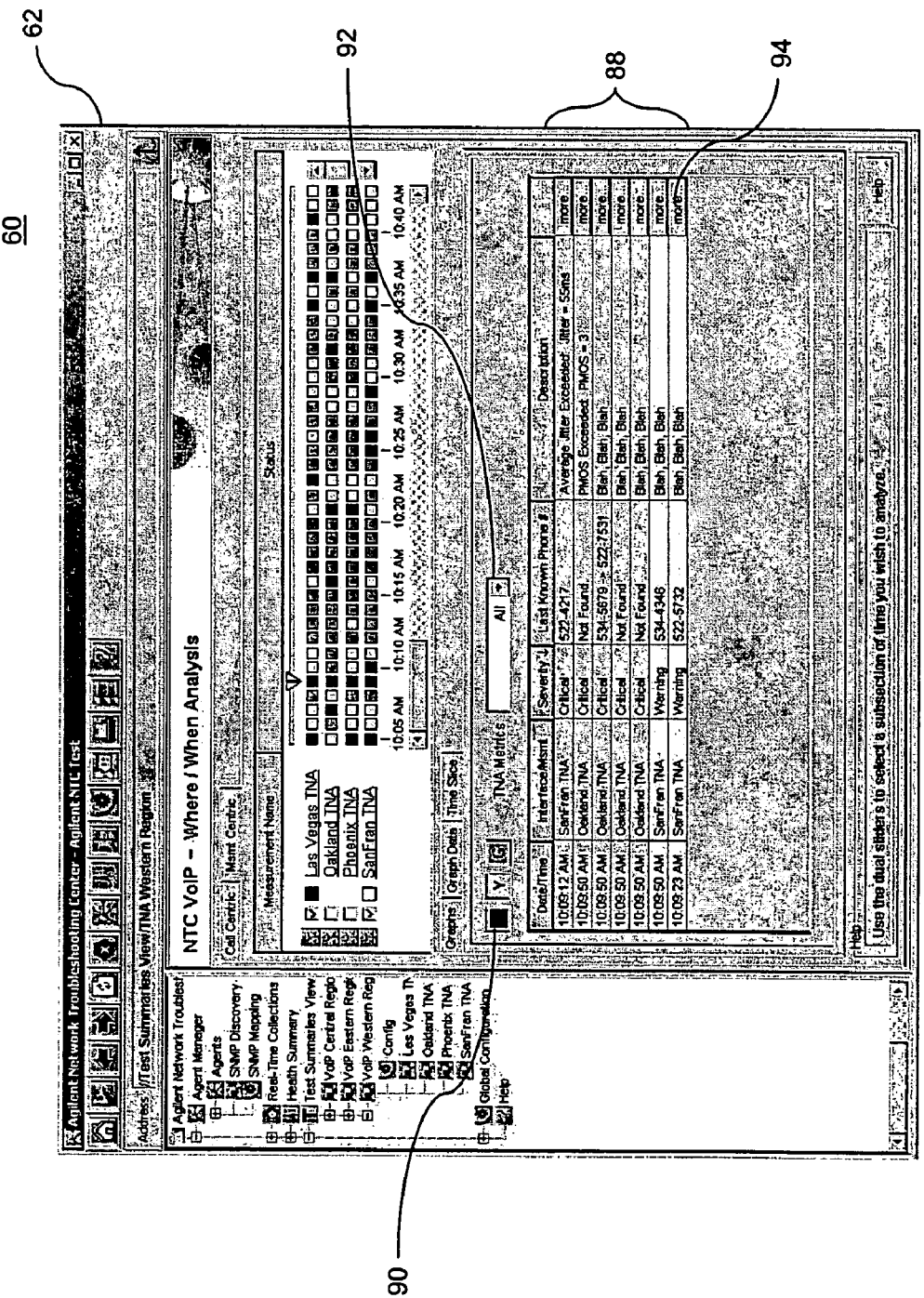

FIGS. 7 and 8 depict embodiments, in which the selectable graphical display 62 displays components of the un-summarized data represented by the selected graph portion 68 in tabular form. Referring to FIG. 7 components of the un-summarized data are displayed as table 86. According to one embodiment, table 86 is sortable by the various table headings. For example, as is depicted in FIG. 7, table 86 is sorted by the first table heading, "measure." The table 86, however, could be sorted by any of the other table headings. This provides the user with the flexibility to quickly access and organize the un-summarized network traffic data.

Referring to FIG. 8, components of the un-summarized data are displayed as table 88. Displayed directly above table 88 are selectable filtering options 90 and 92. The selectable filtering options 90 and 92 allow the user to select and display a subset of the un-summarized data. For example, the selectable filtering option 90 is a threshold selector, and the selectable filtering option 92 is a metric selector. Each of these selectable filtering options 90 and 92 allow the user to filter the un-summarized data and focus on a particular aspect of the data, and/or prevent the user from being overwhelmed by the data. For example, in the threshold filter 90, the R and Y thresholds are selected, and thus table 88 only displays component data for the selected time interval that meet or exceed the R and Y thresholds.

According to one embodiment, table 88 is sortable. For example, the user can sort table 88 by selecting any of the column headings of table 88. As is depicted in FIG. 8, table 88 is sorted by the column heading "Severity."

According to one embodiment, the selectable graphical display displays a selectable information option 94, allowing a user to access more detailed information about a particular entry in table 88. For example, in FIG. 8, each row of table 88 has a selectable information option 94 labeled "more." While the description column in table 88 provides a brief description, the user could select the "more" button 94 to access more detailed information.

The present invention relates to apparatuses to analyze networks, for example, data networks, and telephony networks (for example, wired and/or wireless, and voice over IP networks). But the present invention is not limited to any specific type of network, and various different types of networks can be analyzed by the apparatus.

The present invention relates to selectable filtering options, for example, the threshold selector, and the metric selector. But the present invention is not limited to any particular selector, and many selectors can be used.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method, comprising:
summarizing inflowing data in real time;
displaying the summarized data as a graph in real time;

selecting a portion of the graph using dual sliders; and
operating on the data that was summarized in real time and represented by the selected graph portion.

2. The method according to claim 1, wherein operating on the data that was summarized in real time and represented by the selected graph portion comprises at least one of:
displaying components of the data that was summarized in real time and represented by the selected graph portion; and
exporting the data that was summarized in real time and represented by the selected graph portion.

3. The method according to claim 2, wherein the displaying components of the data that was summarized in real time and represented by the selected graph portion comprises at least one of:
displaying components of the data that was summarized in real time in one or more new graphs; and
displaying components of the data that was summarized in real time in tabular form.

4. The method according to claim 1, further comprising highlighting the selected graph portion.

5. The method according to claim 4, wherein the highlighting the selected graph portion comprises:
displaying the selected portion of the graph as being three-dimensional; and
displaying non-selected portions of the graph as being two-dimensional.

6. The method according to claim 1, wherein the dual sliders comprise a pair of sliders displayed along an axis of the graph.

7. The method according to claim 1, wherein the dual sliders comprise a plurality of dual sliders, respective dual sliders being displayed along at least two axes of the graph.

8. The method according to claim 1, wherein the inflowing data is network traffic information.

9. The method according to claim 1, wherein the inflowing data is Voice over IP network traffic information.

10. A method, comprising:
in a selectable graphical user interface, displaying summarized inflowing data in real time as a graph graphical element; and
integrating a dual slider graphical element with the graph graphical element, enabling a user to select a portion of the graph graphical element using the dual slider and operate on the data that was summarized in real time and represented by the selected portion of the graph graphical element.

11. The method according to claim 10, wherein the dual slider graphical element comprises a pair of sliders displayed along an axis of the graph graphical element.

12. The method according to claim 10, wherein the dual slider graphical element comprises a plurality of dual slider graphical elements, respective dual slider graphical elements being displayed along at least two axes of the graph graphical element.

13. A network analyzing apparatus, comprising:
a graphical user interface providing summarized inflowing network traffic data in real time, wherein a selectable graphical display displays the summarized data as a graph with dual sliders, enabling a user to select a portion of the graph using the dual sliders, and operate on the data that was summarized in real time and represented by the selected graph portion.

14. The apparatus according to claim 13, wherein the selectable graphical display highlights the selected graph portion.

15. The apparatus according to claim 14, wherein the selectable graphical display highlights the selected graph portion by displaying the selected graph portion as being three-dimensional, and displaying non-selected graph portions as being two-dimensional.

16. The apparatus according to claim 13, wherein when the user moves one of the dual sliders in a first direction and contacts the remaining one of the dual sliders, both sliders move in the first direction until one of the user stops movement of the sliders, and the sliders reach a graphical barrier.

17. The apparatus according to claim 13, wherein the dual sliders comprise a pair of sliders displayed along an axis of the graph.

18. The method according to claim 13, wherein the dual sliders comprise a plurality of dual sliders, respective dual sliders being displayed along at least two axes of the graph.

19. The apparatus according to claim 13, wherein operating on the data that was summarized in real time and represented by the selected graph portion comprises at least one of:
the selectable graphical display displaying components of the data that was summarized in real time and represented by the selected graph portion; and
exporting the data that was summarized in real time and represented by the selected graph portion.

20. The apparatus according to claim 19, wherein the selectable graphical display displaying components of the data that was summarized in real time and represented by the selected graph portion comprises at least one of:
the selectable graphical display displaying components of the data that was summarized in real time in one or more new graphs; and
the selectable graphical display displaying components of the data that was summarized in real time in tabular form.

21. The apparatus according to claim 20, wherein when the summarized data is displayed as a threshold indicator graph, and components of the data that was summarized in real time are displayed as the one or more new graphs, thresholds are indicated on the one or more new graphs.

22. The apparatus according to claim 20, wherein when components of the data that was summarized in real time are displayed in tabular form, the graphical display displays a selectable filtering option, enabling the user to select and display a subset of the data that was summarized in real time.

23. The apparatus according to claim 20, wherein when components of the data that was summarized in real time are displayed in tabular form, displayed tabular data is sortable.

24. The apparatus according to claim 22, wherein displayed tabular data is sortable.

25. The apparatus according to claim 20, wherein when components of the data that was summarized in real time are displayed in tabular form, the selectable graphical display displays a selectable information option, enabling a user to access more detailed information.

26. The method according to claim 13, wherein the inflowing network traffic data is Voice over IP network traffic data.

* * * * *